US007949612B2

(12) United States Patent
Davis, III

(10) Patent No.: US 7,949,612 B2
(45) Date of Patent: May 24, 2011

(54) METHOD AND LOAD INPUT DEVICE FOR OPTIMIZING LOG TRUCK PRODUCTIVITY

(75) Inventor: Richard W. Davis, III, Tallahassee, FL (US)

(73) Assignee: Forest Logistics, Inc., Tallahassee, FL (US)

( * ) Notice: Subject to any disclaimer, the term of this patent is extended or adjusted under 35 U.S.C. 154(b) by 994 days.

(21) Appl. No.: 11/725,617

(22) Filed: Mar. 20, 2007

(65) Prior Publication Data

US 2008/0097812 A1    Apr. 24, 2008

(51) Int. Cl.
*G06Q 30/00* (2006.01)
*G06F 19/00* (2006.01)

(52) U.S. Cl. .............. 705/336; 705/7; 705/330; 701/50; 701/117

(58) Field of Classification Search ................... 705/336, 705/330, 7; 701/50, 117
See application file for complete search history.

(56) References Cited

U.S. PATENT DOCUMENTS

| | | | | |
|---|---|---|---|---|
| 3,979,731 | A * | 9/1976 | Naplatanov et al. | 701/118 |
| 5,742,914 | A * | 4/1998 | Hagenbuch | 701/35 |
| 5,758,313 | A * | 5/1998 | Shah et al. | 455/456.2 |
| 2003/0036935 | A1 * | 2/2003 | Nel | 705/7 |
| 2003/0069680 | A1 * | 4/2003 | Cohen et al. | 701/50 |
| 2003/0236719 | A1 * | 12/2003 | Meagher et al. | 705/28 |
| 2005/0171692 | A1 * | 8/2005 | Hamblen et al. | 701/209 |
| 2006/0034201 | A1 * | 2/2006 | Umeda et al. | 370/310 |

OTHER PUBLICATIONS

Mendell et al. "Evaluating the Potential for Shared Log Truck Resources in Middle Georgia". Southern Journal of Applied Forestry, vol. 30, No. 2, May 2006, pp. 86-91.*
Sager, "The sky's the limit for Al-Pac's logging truck tracking system", Pulp & Paper, v67n10, pp. 91-92.*

* cited by examiner

Primary Examiner — John W Hayes
Assistant Examiner — Kevin Flynn
(74) Attorney, Agent, or Firm — John Wiley Horton

(57) ABSTRACT

A method of optimizing log truck productivity utilizing technology allowing the entry of log truck orders from the field. The present invention generally seeks to improve productivity by (1) minimizing the distances log trucks drive with empty loads and (2) improving coordination between groups of log truck drivers and groups of log loaders to allow for more efficient cross-servicing between the parties. Using the load input device, a loader operator in the field enters a "load ticket" that specifies a mill destination, a desired pickup time for the truck to arrive at the logging site and a desired trailer configuration type. This order is transmitted to a server where it is a received into a centralized application or server. A computer running optimization software can match the load with available trucks or trucks about to become available.

15 Claims, 3 Drawing Sheets

US 7,949,612 B2

METHOD AND LOAD INPUT DEVICE FOR OPTIMIZING LOG TRUCK PRODUCTIVITY

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention.

This invention relates to the field of log trucking. More specifically the present invention comprises a method of optimizing log truck productivity utilizing technology allowing the entry of log truck orders from the field.

2. Description of the Related Art

The log trucking industry has long been made up of very independent contractors owning a small number of trucks. These hauling contractors typically form relationships with one logger, and haul almost exclusively for that logger. Because many of such contractors are unreliable, loggers have increasingly turned to owning and operating their own trucks.

Typically log trucks are driven home each night and then driven directly to the woods in the morning. The truck will then go back and forth from this one tract to many mills. At the end of the day, the driver will drive home empty or take a load with them to the house that will be delivered the next morning. This approach results in the driver driving many miles unloaded. A log truck operating in this fashion travels loaded less than 45% of the time, whereas the long-haul trucking industry obtains nearly 90% loaded miles.

FIG. 1 illustrates a typical route for a log truck driver. For the first trip, the driver may drive a substantial distance unloaded to logger LA to pick up a first load. From there, the driver takes the first load to Mill 2. The driver then returns to logger LA to pick up a second load. The second load is taken to Mill 1, and the driver returns to logger LA to pick up a third load. The driver takes the third load to Mill 4 and then returns home with an empty trailer for the day.

The rising cost of fuel is causing the forest industry to reevaluate the sustainability of such a model. Because the drivers, the logging areas, and the mills are geographically dispersed, many opportunities exist to reduce the rate of empty hauling.

Although optimization solutions have long been used in the long haul industry, many factors have prevented the log trucking industry from developing analogous optimized hauling solutions for the log trucking field. For example, the highly independent nature of log truck contractors has prevented them from developing coordinated networks with loggers in their region. In addition, the locations in which tracts of timber are harvested are often located in areas where typical communication or internet services are not available. In the long haul industry loads typically originate from mills or sites where loads are stored well in advance. Loads are sent to trucking companies via telephone calls or internet-based solutions. Since the logging industry does not have this luxury, optimization routing and dispatch software have yet to be employed in any large fashion.

Communication devices that are GPS (Global Positioning System) enabled have been used in the long haul trucking industry since the late 1980's. These systems use several means to send information to the truck, such as satellite, GPRS (General Packet Radio Service), cellular or radio. These systems typically contain some sort of modem to send and receive data, a GPS unit to determine a latitude and longitude coordinate, and a graphical user interface to read and send messages. The long haul industry has used these types of devices for years to send information to truckers about their next load and directions to the pickup and drop off location.

These devices also have the ability to send information from a truck back to a centralized dispatch location. Messages may include estimated time of arrival, breakdown or delay information. Despite the availability of such technology, the industry has yet to develop a solution to enable loggers and log truckers to coordinate more efficient log routing to reduce the distances trucks drive with empty loads.

BRIEF SUMMARY OF THE INVENTION

The present invention comprises a method of optimizing log truck productivity utilizing technology allowing the entry of log truck orders from the field. The present invention generally seeks to improve productivity by (1) minimizing the distances log trucks drive unloaded and (2) improving coordination between groups of log truck drivers and groups of log loaders to allow for more efficient cross-servicing between the parties.

FIG. 2 illustrates a model of improved log truck productivity. Compared to the example illustrated in FIG. 1, the same log truck is able to haul more loads and drive shorter distances unloaded. The reader will note that the truck driver is able to deliver one extra load of logs in the optimized model compared to the example of FIG. 1. In addition, the log truck drives fewer "unloaded" miles in the present example compared to the example of FIG. 1. This increase in productivity results from the efficient cross-servicing between log trucks and loggers LA and LB. Such an optimized model may be accomplished using the device and method described herein.

The present invention accomplishes these and other objectives by providing a method and load input device for optimizing log truck productivity. Using the load input device, a loader operator in the field enters a "load ticket" that specifies a mill destination, a desired pickup time for the truck to arrive at the logging site and a desired trailer configuration type. This order is transmitted to a server where it is a received into a centralized application or server. A computer running optimization software can match the load with available trucks or trucks about to become available.

Loading may be "optimized" by matching loads and trucks using various factors, including: (1) the time a load will become available, (2) the distance from the driver's home to the first load pick-up location for the day, (3) the distance between a driver's previous drop-off destination and the next available load, (4) the amount of time the driver has already worked and whether the driver will be able to get home after dropping off that load within the legal limit of total driving time.

Figure 1:
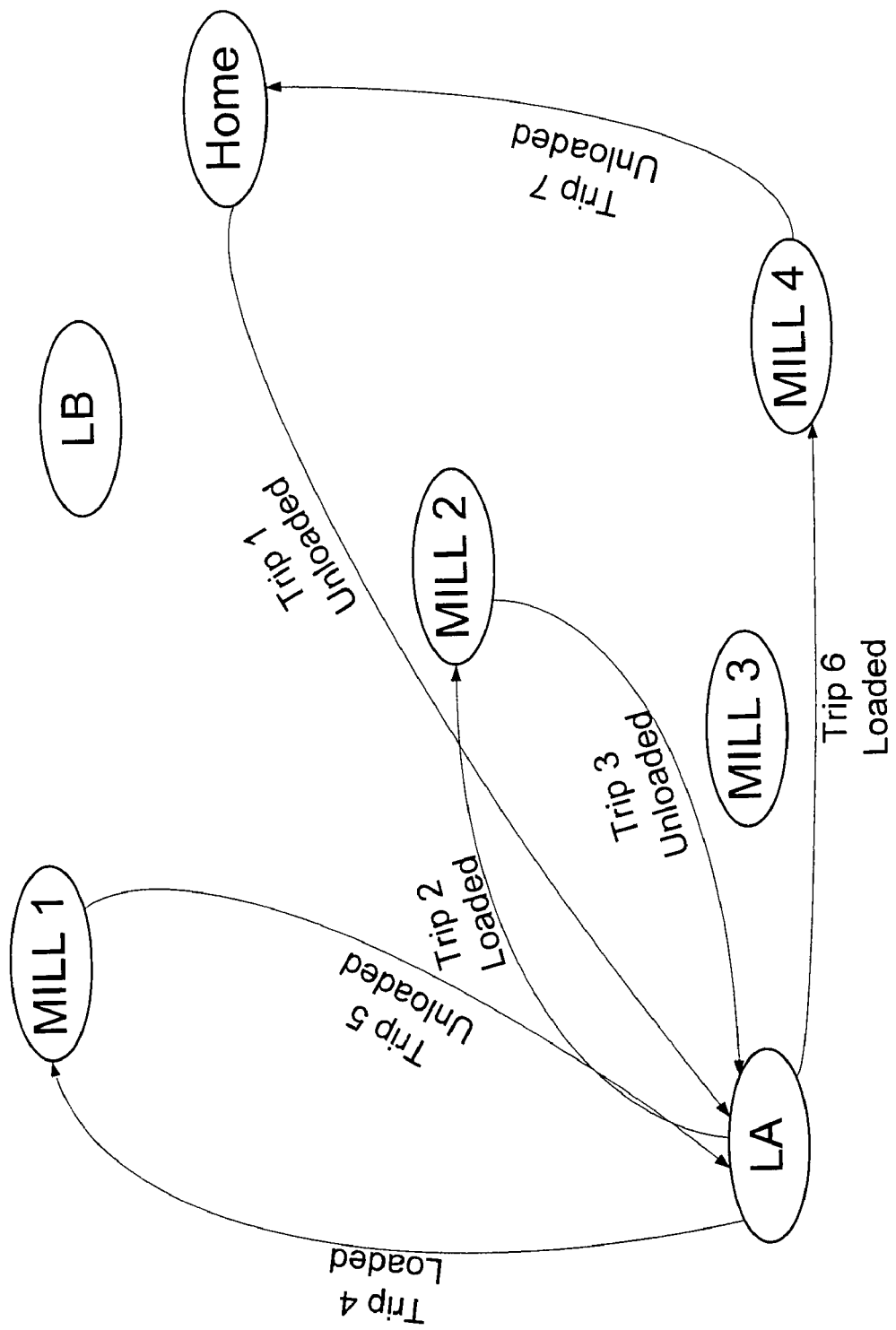
FIG. 1 is a diagram, illustrating a typical route for a log trucker using prior art methods.
Figure 2:
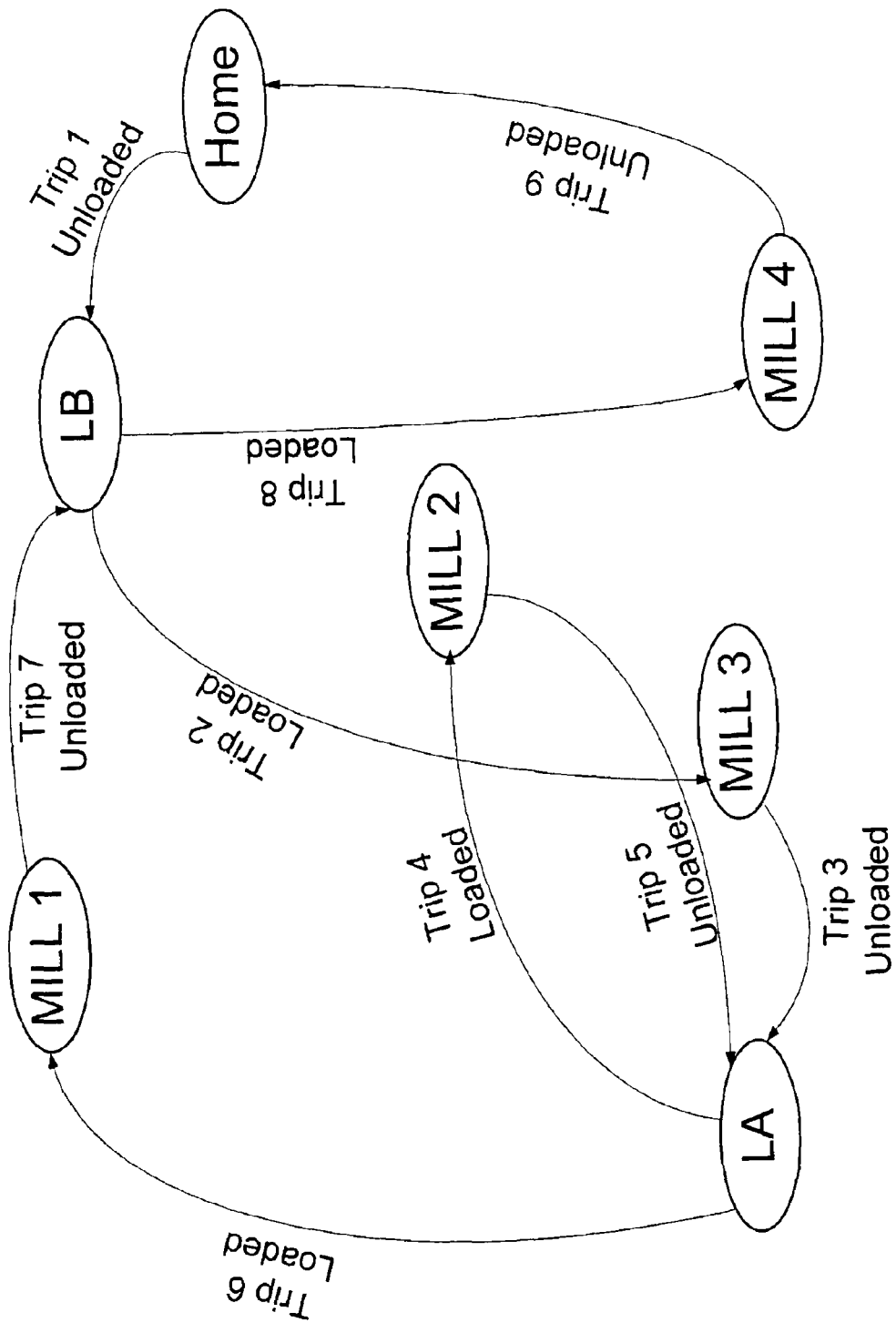
FIG. 2 is a diagram, illustrating an optimized route for a log trucker using the present invention.

REFERENCE NUMERALS IN THE DRAWINGS 10 log haul optimization system
12 load request input device
14 load input device
16 server
18 status data
20 load pick-up data
22 load data
24 load pick-up data
26 optimizer
28 load queue
30 truck queue

DETAILED DESCRIPTION OF THE INVENTION

Figure 3:
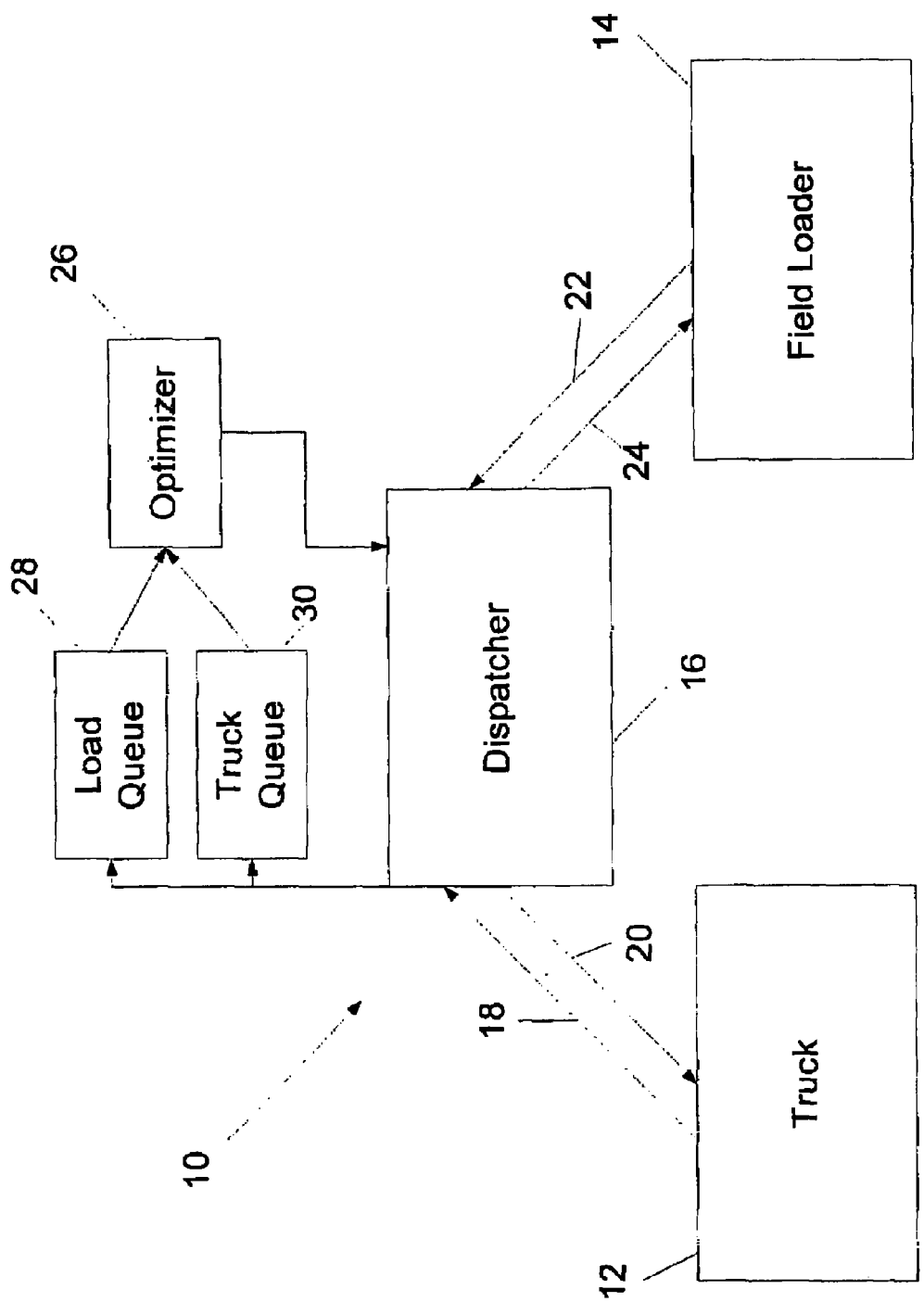
FIG. 3 is a flowchart, illustrating the present invention.

As illustrated in FIG. 3, the present method improves log truck productivity by coordinating the activities of a log truck and a field loader through a dispatcher. Although a single log truck and a single field loader are illustrated, the reader should note that the present invention preferably coordinates the activities of multiple log trucks with multiple field loaders through the same dispatcher.

Each field loader utilizes load input device 14 to transmit load data 22 to server 16 via a transmission means. Load input device 14 includes a data input means for inputting load data about a load of logs to be hauled. The data input means may be a keyboard, a touchpad, or other known means for inputting data. The load data may include the time in which the load of logs will be available for pickup, the destination where the load of logs is to be delivered, and the desired trailer configuration for hauling the load of logs. The destination may be entered as a three character "mill code" similar to that which is used for airports. The destination data or mill code describes the processing or storage location to which the load of logs is to be hauled. For example, logs with large diameters may be processed into lumber by lumber mills while smaller logs may be converted to pulp by pulp mills. Similarly, different trailer configurations are used in the industry based upon the size and form of the trees to be hauled.

The transmission means can be any means that is configured to transmit data. In the preferred embodiment, the transmission means transmits the data wirelessly from load input device 14 to server 16. Load input device 14 may also be equipped with a GPS transponder or other device capable of determining the geographic coordinate (such as latitude and longitude) of load input device 14 or the field loader. The transmission means preferably transmits data regarding the geographic location of the field loader or the load of logs to be hauled along with the load data to server 16.

Load input device 14 further includes a receiving means for receiving load pick-up data 24 transmitted from server 16. Load pick-up data 24 is preferably transmitted in the same transmission medium as load data 22. For example, the transmitting means and receiving means may comprise a cellular-type transceiver. The transmitting means may also be GPRS, satellite, or radio type transceivers. Load pick-up data 24 preferably includes identification data describing and identifying the log truck which will be dispatched to pick up the load. Load input device 14 also includes a display screen for displaying the identification data transmitted by server 16.

Each log truck utilizes load request input device 12 to transmit status data 18 to server 16 via a transmission means.

Load request input device 12 principally includes many of the same elements of load input device 14. A data input means is provided for inputting status data regarding a log truck's availability to transport a load. For example, a log truck may transmit a time in which it will be available to pickup a load to server 16. Like load input device 14, load request input device 12 also includes a transmitting means for transmitting status data 18 to server 16. The transmission means may further configured to transmit data describing said log truck's identity and location along with status data 18. For example, a unique identifier may be transmitted with the time so that server 16 knows which log truck is transmitting data. Load request input device 12 may also be equipped with a GPS transponder or other device which is configured to determine the location of load request input device 12 or the log truck. Coordinate data may be transmitted with status data 18 as well.

Load request input device 12 also includes a means for receiving load pick-up data 20 transmitted from server 16. Load pick-up data 20 describes pick-up arrangements for a load of logs which the truck is to haul. For example load pick-up data 20 may include the location of the load, a time when the load will be available for pickup, and the destination where the load is to be delivered. Load input device 12 preferably includes a display screen configured to display load pick-up data 20 for the driver of the log truck.

Server 16 compiles status data 18 and load data 22 into truck queue 30 and load queue 28, respectively. Truck queue 30 contains data describing log trucks that are available to haul loads, the time when the trucks are available, the locations of the log trucks or where each of the log trucks delivered its previous load, and a unique identifier for each log truck. Since each log truck is "registered" with server 16, server 16 also knows where the driver of the log truck lives, the trailer configuration for the truck, and how many hours the truck driver has worked during the day.

Load queue 28 contains data describing the load of logs available for pickup from each field loader. This includes the geographic location of each load, the time when each load is available for pick-up, the type of trailer required to haul each load, and the destination to which each load is to be hauled.

Optimizer 26 processes load queue 28 and truck queue 30 to determine a best available truck to haul each load that needs to be hauled. Optimizer 26 may use many different algorithms to optimize log truck productivity. Although many criteria may be utilized to optimize productivity, it is generally preferred that optimizer 26 is configured to seek to reduce empty load distances traveled by the group of log trucks that are available to haul loads. Accordingly, optimizer 26 matches available log trucks in truck queue 30 with available loads in load queue 28 based on factors, including: (1) the time a load will become available, (2) the distance from the driver's home to the first load pick-up location for the day, (3) the distance between a driver's previous drop-off destination and the next available load, (4) the amount of time the driver has already worked and whether the driver will be able to get home after dropping off that load within the legal hours. Techniques for deriving optimization algorithms based on the above described parameters are known by those skilled in the art.

As mentioned previously, the dispatcher transmits load pick-up data 20 and 24 through server 16 to the log truck and field loader, respectively. The reader will now appreciate that load pick-up data 20 and 24 may be automatically generated by optimizer 26 or server 16 without the need for human intervention. For example, software may be used to convert status data 18 and load data 22 into the form needed for load queue 28 and truck queue 30. Optimizer 26 can utilize software containing optimization algorithms to match items in load queue 28 with items in truck queue 30. After optimizer 26 matches a load with a truck, the pick-up arrangement (including the time, location of pickup, destination to which the load is to be hauled, and the identity if the log truck and field loader) are transmitted to the interested parties via server 16.

Load input device 14 and load request device 12 are preferably portable units which can travel with the field loaders and log trucks. As mentioned previously, the transmission means used by these devices are preferably "wireless," so that load input device 14 and load request device 12 may transmit to and receive data from server 16 while in the field. This feature allows for seamless coordination between the parties, particularly if GPS-type data is transmitted with status data 18 and load data 22. The automatic transmission of GPS-type data reduces the risk of log truck drivers and field loaders from entering incorrect location data.

The preceding description contains significant detail regarding the novel aspects of the present invention. It should not be construed, however, as limiting the scope of the invention but rather as providing illustrations of the preferred embodiments of the invention. As an example, many optimization schemes may be implemented by optimizer 26 to promote increased productivity. These schemes may be more appropriately tailored to considerations relevant to the region where the proposed method and devices are to be used. Thus, the scope of the invention should be fixed by the following claims, rather than by the examples given.

The invention claimed is:

1. A method for optimizing hauling productivity for a plurality of log trucks picking up a plurality of log loads from a plurality of log loaders and hauling said plurality of log loads to a plurality of mills, comprising the steps of:
   a. providing a computer running an optimizer program;
   b. providing a log load input device to each of said plurality of log loaders, each of said log load input devices including
      i. means for inputting load data about each of said plurality of log loads, said load data including a desired trailer configuration type, location where a log load is to be picked up, destination for said log load, and a time when said log load will be available to be picked up,
      ii. means for wirelessly transmitting said load data to said computer running said optimizer program;
   c. entering said load data into said log load input device;
   d. transmitting said load data from said log load input device to said computer;
   e. providing a load request input device to each of said log trucks, each of said load request input devices including
      i. means for inputting status data about a log truck, said status data including present location of said log truck, and a time when said log truck will be available to pick up one of said plurality of log loads,
      ii. means for wirelessly transmitting said status data to said computer running said optimizer program;
   f. entering said status data into said load request input device;
   g. transmitting said status data from said load request input device to said computer;
   h. using said optimizer program running on said computer to create a load queue containing all of said load data and a truck queue containing all of said status data;
   i. assigning said log trucks corresponding to said status data to said log loads corresponding to said load data in order to minimize unloaded travel of said log trucks, thereby creating log truck assignments whereby each of said trucks is assigned to one of said log loads; and
   j. transmitting said log truck assignments from said computer to said log load input devices and said load request input devices.

2. The method of claim 1, wherein each of said log load input devices includes a GPS receiver which automatically determines and enters said location where said log load is to be picked up.

3. The method of claim 1, wherein each of said load request input devices includes a GPS receiver which automatically determines and enters said location of said log truck.

4. The method of claim 3, wherein said computer monitors the total time of operation for a driver of said log truck.

5. The method of claim 4, further comprising using said optimizer program to prevent assigning a log load to a truck when such an assignment will cause said driver of said log truck to exceed a defined total time of operation.

6. The method of claim 5, further comprising the steps of:
   providing a display connected to said load request input device.

7. The method of claim 1, further comprising providing a display connected to said log load input device.

8. The method of claim 1, wherein said steps of transmitting said load data, transmitting said status data, and transmitting said log truck assignments are performed using cellular transmissions.

9. The method of claim 1, wherein said log load input device is portable.

10. The method of claim 1, further comprising the step of:
    optimizing the transport of said plurality of loads by determining a best available log truck from a group of available log trucks to carry one of said plurality of loads;
    wherein said group of available log trucks include log trucks which have transmitted status data to said server; and
    wherein said best available log truck is determined by utilizing said load data transmitted by said plurality of log loaders together with said status data and data describing the identity and location of each of said group of available log trucks to reduce empty load travel distances for said group of available log trucks.

11. The method of claim 1, said log load input device further including:
    a means for receiving load pick-up data transmitted from said server, said load pick-up data describing pick-up arrangements for said one of said plurality of loads; and
    a display screen configured to display said pick-up data or descriptions thereof.

12. The method of claim 1, said load request input device further including:
    a. a means for receiving load pick-up data transmitted from said server, said load pick-up data including an expected time when said load will be picked up; and
    b. a display screen configured to display said load pick-up data.

13. The method of claim 12, said load data including:
    a destination where said one of said plurality of loads is to be delivered.

14. A method for optimizing hauling productivity for a plurality of log trucks picking up a plurality of log loads from a plurality of log loaders and hauling said plurality of log loads to a plurality of mills, comprising the steps of:
    a. providing a computer running an optimizer program;
    b. providing a log load input device to each of said plurality of log loaders, each of said log load input device including i. means for inputting load data about each of said plurality of log loads, said load data including a type of log load to be picked up, location where a log load is to be picked up, destination for said log load, and a time when said log load will be available to be picked up,
ii. means for wirelessly transmitting said load data to said computer running said optimizer program;
c. entering said load data into said log load input device;
d. transmitting said load data from said log load input device to said computer;
e. providing a load request input device to each of said log trucks, each of said load request input devices including
   i. means for inputting status data about a log truck, said status data including the present location of said log truck, and a time when said log truck will be available to pick up one of said plurality of log loads,
   ii. means for wirelessly transmitting said status data to said computer running said optimizer program;
f. entering said status data into said load request input device;
g. transmitting said status data from said load request input device to said computer;
h. using said optimizer program running on said computer to create a load queue containing all of said load data and a truck queue containing all of said status data;
i. assigning said log trucks corresponding to said status data to said log loads corresponding to said load data in order to minimize unloaded travel of said log trucks, thereby creating log truck assignments whereby each of said trucks is assigned to one of said log loads; and
j. transmitting said log truck assignments from said computer to said log load input devices and said load request input devices.

15. The method of claim 14 further comprising:
a. registering each of said log trucks with said computer so that said computer has information as to each of said log truck's trailer configuration type; and
b. using said information as to said trailer configuration types to match said registered log trucks against said load data.

\* \* \* \* \*